| United States Patent [19] | [11] Patent Number: 4,530,913 |
|---|---|
| Pullukat et al. | [45] Date of Patent: Jul. 23, 1985 |

[54] POLYMERIZATION CATALYST AND METHOD

[75] Inventors: Thomas J. Pullukat, Hoffman Estates; Raymond E. Hoff, Palatine, both of Ill.

[73] Assignee: Chemplex Company, Rolling Meadows, Ill.

[21] Appl. No.: 112,560

[22] Filed: Jan. 16, 1980

[51] Int. Cl.³ ............................ C08F 4/64; C08F 4/68
[52] U.S. Cl. .................................. 502/104; 502/113; 502/114; 502/115; 502/116; 502/117; 502/120; 502/124; 502/125; 502/128; 526/128
[58] Field of Search ............... 252/429 B, 429 C, 428, 252/430; 502/104, 120, 114, 115, 116, 128, 124, 125, 113, 117

[56] References Cited

U.S. PATENT DOCUMENTS 3,775,391  11/1973  Jennings et al. ............ 252/429 B X
3,787,384   1/1974  Stevens et al. ............. 252/429 C X
3,943,067   3/1976  Chan et al. ................. 252/429 C X
4,173,547  11/1979  Graff .............................. 252/429 B
4,301,029  11/1981  Caunt et al. ..................... 502/104 X

*Primary Examiner*—Patrick P. Garvin
*Attorney, Agent, or Firm*—Wood, Dalton, Phillips, Mason & Rowe

[57] ABSTRACT

A catalyst and method in which the catalyst is used with an aluminum cocatalyst in the polymerization and copolymerization of 1-olefins and is prepared by reacting a monofunctional organic silicon compound with silica, alumina, or the like followed by reacting the product of this reaction with a Group IIA organometallic compound or complex, then reacting this product with a halide or alkoxide of a metal of Group IVB or Group VB or mixtures thereof. If desired, the halide or alkoxide may be first reacted with the silicon compound reaction product before the reacting with the organometallic compound or complex.

44 Claims, No Drawings

POLYMERIZATION CATALYST AND METHOD

BACKGROUND OF THE INVENTION

The catalysts of this invention are produced by (1) reacting a monofunctional organic silicon compound with silica or alumina or a mixture thereof, (2) reacting the product of (1) with a Group IIA organometallic compound or complex of magnesium or calcium, and (3) reacting the product of (2) with a halide or alkoxide of titanium, vanadium, zirconium or mixtures of these, or (2') reacting the product of (1) with an alkyl aluminum halide and a Group IIA organometallic compound or complex of magnesium or calcium prior to (3), or (1') reacting the product of (1) with the halide or alkoxide of (3) prior to (2).

K. Ziegler first discovered two component catalysts based on compounds of the Group IVB–VIB metals of the periodic table and an organometallic compound belonging to Groups I–IIIA of the periodic table for the polymerization of olefins. Since his discovery, numerous catalysts have been disclosed as improvements over the original Ziegler catalysts. Most of these catalyst systems are of relatively low activity and stability. They require a costly catalyst removal step.

One of the modifications attempted in an effort to increase the activity of the Ziegler type catalyst was to deposit the catalyst components on an inert support. In U.S. Pat. No. 2,981,725 such a process is disclosed. The supports used were magnesium chloride, silicon carbide, silica gel, calcium chloride, etc. The activity of the catalysts disclosed in this patent was still low.

Recently several catalyst systems have been disclosed in which titanium or vanadium halides are reacted with magnesium containing supports such as magnesium alkoxide, magnesium hydroxy chloride, etc. U.S. Pat. Nos. 3,654,249; 3,759,884; 4,039,472; 4,082,692 and 4,097,409 describe such catalysts. In catalysts that contain silica, a thermal activation of silica prior to deposition of the catalyst components is necessary.

None of these patents disclose the methods and products of this invention.

SUMMARY OF THE INVENTION

This invention provides novel catalysts, methods of making them and methods for the polymerization and copolymerization of alpha-olefins. These catalysts are especially useful for the polymerization of ethylene to high density polyethylene, and for the copolymerization of ethylene with alpha-olefins for the formation of medium and low density copolymers. These improved catalysts are highly active and are well suited for the economical and energy efficient particle form and gas phase processes. Specifically, the object of this invention is to improve the well known Ziegler type catalyst by the method of this invention. These improved catalysts can be easily adapted to the particle form or gas phase process plants. Polymers made using the invention catalysts can have high MI and narrow molecular weight distribution. Thus, polymers well suited for injection molding and rotational molding applications can be manufactured. The catalysts of this invention are stable, particulate, and easy flowing.

DESCRIPTION OF THE PREFERRED EMBODIMENTS

The catalysts of this invention have higher reactivity in olefin polymerization than normal Ziegler catalysts. The reaction of organic silicon compounds with silica or alumina is the critical step in obtaining higher reactivity. This is shown by comparative examples. Since the silica does not need to be thermally activated at high temperatures, the cost of the fuel used for heating and the cost of the furnace or other equipment can be avoided. Furthermore, the losses of material which are frequently encountered in operations such as heating in a fluidized bed can also be avoided. The catalysts described by this invention are suitable for economic gas phase or particle form processes. The polymers made by this catalyst do not need a post reaction step to remove the catalyst residues. In a particle form process, the polymers are particulate in nature and do not show fouling tendencies compared to prior art catalysts.

This invention consists of improved catalysts for the polymerization of alpha-olefins. The catalysts are made by first reacting a monofunctional organic silicon compound with silica or alumina. The reaction product is subsequently reacted with a Group IIA organometallic compound or complex. After completing this reaction, a halide or alkoxide of Group IVB or VB metal is added. The resulting solid component is separated by solvent evaporation or solvent filtration. The solid catalyst component is fed to the polymerization reactor along with an alkyl aluminum compound. The silica can have minor amounts of titania, zirconia, magnesia, etc.

The Group IIA metals that are especially useful in this invention include calcium and magnesium.

The Group IVB and Group VB metals that are especially useful in this invention include titanium, zirconium and vanadium.

The preferred titanium compound may be selected from the following formulas:

$$TiX_4$$

$$(R'O)_m Ti(OR')_n$$

$$TiX_m(OR')_{(4-m)}$$

in which m is 1, 2, 3 or 4, n is 0, 1, 2 or 3 and m plus n equals 4; R' is selected from alkyl, aryl, cycloalkyl, alkaryl, cyclopentadienyl and alkenyl, for example, ethenyl, propenyl and isopropenyl, each of these groups having 1 to 12 carbon atoms, and X is halogen. When more than one R' group occurs in the titanium compound, the groups can be the same or different. The halides and haloalkoxides of titanium are preferred.

The quantity of titanium metal used in the process of the present invention is suitably in the range of 0.05–50.0% based on the weight of the support material, and preferably in the range of 0.5–20.0%.

The Group IVB and VB metal halide or alkoxide is preferred. Mixtures of Group IVB and VB compounds can also be used. The concentration of the Group IVB and VB metal in the catalyst can vary from 0.1–20.0 wt. % based on the weight of the catalyst.

The Group IIA organometal compounds are preferably the alkyls or aryls of magnesium or its complexes such as that with alkyl aluminum compounds. The structural formulae of some preferred compounds are $R_2Mg$ and $(R_2Mg)_n \cdot AlR_3$ where R is alkyl containing 1–10 carbon atoms or aryl such as phenyl, naphthyl and cyclopentadienyl and n is 0.5–10. Complexes of organomagnesium compounds with organoaluminum halides can also be used.

The ratio by weight of Group IIA metal to the Group IVB and VB metal can vary from 0.1–100 even though 0.1–20 is the preferred range. The metal alkyls or aryls may also contain a halide in addition to the organic moiety.

The silica can be dried at 100°–200° C. to remove the surface water or it can be used as it is before the reaction with the organosilicon compounds. The organosilicon compounds are those that react with the surface hydroxyl groups on silica or alumina. Examples of these compounds have the following structures: $(R_3Si)_2NH$, $R_3Si(OR)$, $R_3SiX$ and $(R_3Si)_2O$ where R is alkyl or aryl, preferably each containing 1 to 20 carbon atoms, and X is halogen. Specific examples are hexamethyl disilazane, trialkylsilyl ethoxide, alkyl chlorosilanes, etc. The reaction of silica with the organosilicon compound can be done in any convenient way, i.e., in solution, direct liquid-solid reaction, vapor phase reaction, etc. In the reaction of the organosilicon compounds with silica or alumina an excess of the organosilicon compounds is used to facilitate a complete reaction. After the reaction of silica or alumina with the organosilicon compound, it should not be thermally treated but should be stripped of any excess organosilicon compound and by-products of the reaction by vacuum suction, solvent washing in which the preferred solvent is a liquid hydrocarbon or by purging with a gas. This can be done at a temperature between ambient and about 200° C.

The alkyl aluminum cocatalyst can be chosen from trialkyl aluminum compounds and alkyl aluminum hydride compounds and their mixtures. The alkyl groups of suitable cocatalysts have hydrocarbon chains containing one or about ten carbon atoms and may be straight-chained or branched. Triaryl aluminum compounds may also be used but because they are not so readily obtained as the alkyl compounds they are not preferred. Examples of suitable cocatalysts are triethylaluminum, trioctyl aluminum, tri(2-methyl pentyl)aluminum and diethyl aluminum hydride. Triisobutyl aluminum and diisobutylaluminum hydride are especially preferred. If needed, alkyl aluminum halides may be used along with the alkyl aluminum compounds described above.

The cocatalyst may be fed to the polymerization reactor along with the above-described solid component in the same or preferably separate lines. The molar ratio of the cocatalyst to the Group IVB and VB metal compounds in the solid component can be from 0.1:1 to 100:1 although the preferred range is 1:1 to 20:1.

When using the catalyst according to the invention at least one 1-olefin of the formula $R-CH=CH_2$, where R is hydrogen or a straight chain or branched alkyl radical having from 1 to 10, preferably from 1 to 8, carbon atoms is polymerized. Examples of such olefins are ethylene, propylene, butene-1, hexene-1, 4-methylpentene-1, octene-1. Ethylene is polymerized alone or as a mixture consisting of at least 70% by weight of ethylene and at most 30% by weight of a 1-olefin of the above formula.

The polymerization may be carried out in suspension, solution or in the gaseous phase, continuously or discontinuously, at a temperature of from 20°–150° C., preferably from 60°–110° C., under a pressure of from 100 psi to 1000 psi gauge. It is carried out preferably under the technically interesting pressure in the range of from 300–800 psi.

The melt index of the polyethylene produced by the invention catalyst can be controlled by methods known to the art such as increasing the temperature of polymerization or by the addition of hydrogen. These catalysts show relatively high activity in ethylene polymerization and copolymerization. The polymers can be easily blended with antioxidants and pelletized for commercial use. High partial pressures of hydrogen can be used to yield very high melt index products.

To summarize, therefore, the catalyst of this invention is prepared by (1) reacting a monofunctional organosilicon compound with silica or alumina or mixtures, (2) reacting the product of (1) with a Group IIA organometallic compound or complex, and (3) reacting the product of (2) with a halide or alkoxide of a metal of Group IVB or Group VB or mixtures of said halide or alkoxide. The solid catalyst product of (3) is used with an alkyl or aryl aluminum compound prior to and/or during the polymerization reaction.

The catalysts are useful for producing polymers of 1-olefins of 2 to 8 carbon atoms and copolymers of these with 1-olefins of 2 to 20 carbon atoms to form solid polymers or copolymers.

The reactant of step (1) above with the organosilicon compound is preferably silica or alumina or mixtures of these but may also be with thoria, zirconia, titania, magnesia or mixtures of these or mixtures with silica or alumina or both.

EXAMPLE 1

(Comparative)

A catalyst was prepared from Davison Chemical Company Grade 952 silica. The reactions were conducted in a dry, nitrogen purged flask immersed in an ice water bath. First 3.3 grams of the silica was added and the silica was stirred for thirty minutes at the low temperature. Then 20.8 ml of a $(Bu_2Mg)_{6.5}Et_3Al$ solution in heptane (10% wt.) was added by syringe (1.46 grams of complex). The mixture was stirred for thirty minutes and then 1.13 ml (1.92 grams) of titanium tetrachloride was added. After an additional thirty minutes at 0° C. the flask was placed in a bath at 90° C. and the solvent was evaporated under nitrogen flow. A portion of the catalyst was tested in a pressure vessel using isobutane diluent at a total pressure of 550 psig at 221° F. with a hydrogen partial pressure of 50 psig. TIBAL was added to give 9.2 m moles per gram of solid catalyst. The reactivity was found to be 2445 g/g cat/hr. (34,500 g/g Ti/hr).

EXAMPLE 2

(Silane Treated Silica)

A catalyst was prepared in the same way as in Example 1 except that the silica had been treated with hexamethyl disilazane. The reactions were also conducted at room temperature instead of 0° C. The polymerization test with this catalyst shows that it is much more reactive than the catalyst made with the untreated Davison Grade 952 silica. Under the same conditions, the reactivity was found to be 8570 g/g cat/hr. (122,000 g/g Ti/hr).

EXAMPLE 3

In a three-necked flask which has been purged free of air with nitrogen was placed 10 grams of hexamethyldisilazane-treated Davison 952 silica. 10 cc of ethylaluminum sesquichloride (25% solution in heptane), 10 cc of $(Bu_2Mg)_{6.5}Et_3Al$ (10% solution in heptane) and 1.5 cc of titanium tetraisopropoxide solution (20% in pentane) were syringed into the flask. A portion of the dry brown powder was used in ethylene polymerization at 223° F. using TIBAL as a cocatalyst. The reactivity of the catalyst was 4402 g/g cat/hr.

EXAMPLE 4

(Comparative)

In this experiment the silane treated silica was replaced with untreated Davison 952 silica, dried at 560° C. Otherwise, conditions were the same as the example above. The reactivity of this catalyst was only 1477 g/g cat/hr.

EXAMPLE 5

Into a nitrogen-purged 250 ml three-necked flask was placed 1.9 grams of hexamethyldisilazane-treated silica. The nitrogen purging was continued for an additional one hour to remove any entrapped air in the silane treated silica. 18.5 cc of $(n-Bu_2Mg)_{7.5}Et_3Al$ in a 5 wt. % solution in heptane was added to the flask and the contents were stirred for ½ hour. 0.47 ml of titanium tetrachloride, calculated to give 6.1 wt. % titanium on the final catalyst, was added with stirring. The whole reaction mixture turned black in color. After ½ hour, this catalyst was dried at 90° C. with a nitrogen purge. About 16.3 mg of this dry powder was placed in a nitrogen purged 1300 ml stainless steel reactor held at 215° F. Triisobutyl aluminum (TIBAL) was added to the reactor to give an Al/Ti ratio of about 7. The reactor was closed and 500 ml of isobutane was metered in. 50 pounds of hydrogen was pressured into the reactor. Ethylene was continuously fed to the reactor to maintain a total constant pressure of 550 psig. After one hour of polymerization the polymer was recovered by flash evaporation of the solvent. The reactivity of the catalyst was found to be 9202 g/g cat/hr. The melt index of the polyethylene was 0.28 (ASTM D-1238 52T). An $R_d$ of 2.7 was measured for this polymer indicating narrow molecular weight distribution. The $R_d$ value was measured as described in the article in Polymer Engineering and Science, Vol. II, pages 124–128 (1971).

EXAMPLE 6

(Comparative)

A catalyst similar to the above example was prepared. Ethylene polymerization in the absence of triisobutyl aluminum showed reactivity of only 419 g/g cat/hr.

The following examples show that silane treated silica is not an effective ingredient with certain catalyst compositions. The data indicates that an organometal compound of Group IIA is necessary for the desired effect.

EXAMPLE 7

(Comparative)

2.2 grams of silica which was dried at 120° C. was placed in a nitrogen purged flask. It was treated with 11.02 ml of diethylaluminum chloride solution (25.5% by weight in heptane). This mixture was stirred for 0.5 hour. Subsequently 0.54 ml of $TiCl_4$ was added to the reaction flask and stirring was continued for another 0.5 hour. The catalyst was dried at 90° C. Ethylene was polymerized using this catalyst with TIBAL as a cocatalyst. The reactivity was 859 g/g cat/hr.

EXAMPLE 8

In this example silica was replaced with hexamethyl disilazane treated silica. Other conditions were similar to the above control example. The reactivity in ethylene polymerization was 816 g/g cat/hr. This indicates that silane treated silica is not effective with certain catalyst ingredients. Similar comparisons with TIBAL in place of diethylaluminum chloride did not give improvement in activity with silane treated silica compared to untreated silica.

The following examples show the catalyst in this invention gives polyethylene with narrower molecular weight distribution.

EXAMPLE 9

A 2 liter three-necked flask was purged with nitrogen. Hexamethyldisilazane-treated silica (200 grams) dried in an oven at 110° C. was placed in the flask. It was again purged free of air. 345 ml of a 10% heptane solution of $(n-C_4H_9)_2Mg_{6.5}(C_2H_5)_3Al$ was added slowly with stirring. 500 ml of dry heptane was added to make a slurry. The reaction was allowed to continue for 5 hours. $TiCl_4$ (28 ml) was added dropwise over a 2 hour period. Stirring of the reaction mixture was continued for 16 hours. The catalyst was dried at 90° C. with a purge of nitrogen. The final catalyst contained 4.2% titanium. This catalyst was used in ethylene polymerization in a continuous particle form reactor at 218° F. 1.5 mol percent hydrogen was used to regulate the MI. The polymer produced has an $R_d$ of 5.4 and MI of 5.0.

EXAMPLE 10

(Comparative)

A similar catalyst as above was made with unmodified silica thermally activated at 600° C. Ethylene was polymerized at 218° F. with this catalyst along with 1.5 mol percent hydrogen. The polymer had 6 MI but had an $R_d$ of 8.9 indicating broader molecular weight distribution.

EXAMPLE 11

In a nitrogen purged dry 500 ml three-necked flask was placed 2.4 grams of hexamethyl disilazane treated silica. The hexamethyl disilazane silica was used without any thermal treatment. 23.4 ml of $(n-C_4H_5)_2Mg_{7.5}(C_2H_5)_3Al$ (5% solution in heptane) was syringed into the flask with stirring. The reaction was allowed to proceed for one hour. $TiCl_4$ (0.60 ml) was added dropwise to give 6.1% titanium on the catalyst. The reaction was continued for ½ hour. The contents were dried at 94° C. for 0.75 hour. The dry powder was dark brown in color. 50.7 ml of this catalyst was used along with triisobutyl aluminum in ethylene polymerization (Al/Ti=7.2). 50 psi hydrogen partial pressure and 550 psig total pressure was used. The reaction temperature was 215° F. The reactivity of this catalyst was 7976 g/g cat/hr.

EXAMPLE 12

In this experiment the catalyst from the above example was used with tri-n-hexyl aluminum as a cocatalyst (Al/Ti=7.2). The reactivity in ethylene polymerization was 6991 g/g cat/hr.

EXAMPLE 13

In this example the catalyst from Example 11 was used along with triisobutyl aluminum as a catalyst. This was used in ethylene-hexene-1 copolymerization to give polyethylene with 0.953 density.

Having described our invention as related to the embodiments set out herein, it is our intention that the invention be not limited by any of the details of description, unless otherwise specified, but rather be construed broadly within its spirit and scope as set out in the appended claims.

We claim:

1. A solid catalyst for use with an alkyl or aryl aluminum compound cocatalyst in the polymerization and copolymerization of 1-olefins, and prepared by: (1) reacting a halogen free monofunctional organic silicon compound with silica or alumina having surface hydroxyl groups or a mixture thereof, said silicon compound being reactive with said surface hydroxyl groups; (2) reacting the product of (1) with a Group IIA organometallic compound, or complex of an alkyl aluminum compound, of magnesium or calcium; and (3) reacting the product of (2) with a halide or alkoxide of titanium, vanadium, zirconium or mixtures of these; or (2') reacting the product of (1) with an alkyl aluminum halide and a Group IIA organometallic compound, or complex of an alkyl aluminum compound, of magnesium or calcium prior to (3); or (1') reacting the product of (1) with the halide or alkoxide of (3) prior to (2).

2. The catalyst of claim 1 wherein the metal of step (3) is in a concentration of about 0.1–20 weight percent of said solid product.

3. The catalyst of claim 1 wherein said Group IIA compound or complex of (2) comprises an alkyl or aryl of magnesium or a magnesium complex.

4. The catalyst of claim 1 wherein the weight ratio of the Group IIA metal compound to the Group IVB or VB metal compound is from 0.1–100.

5. The catalyst of claim 4 wherein said weight ratio is about 0.1–20.

6. The catalyst of claim 1 wherein one or more of said organometallic compounds contains a halide in addition to the organic moiety.

7. The catalyst of claim 1 wherein said reaction of (1) is with silica which has been predried at about 100°–200° C. for a time sufficient to remove surface water prior to said reaction.

8. The catalyst of claim 1 wherein said organic silicon compound in (1) is in stoichiometric excess thereby facilitating a complete reaction, and said excess is later removed.

9. The catalyst of claim 1 wherein the product of (1) is separated from any unreacted organic silicon compound and reaction by-products.

10. The catalyst of claim 9 wherein said separation is by vacuum suction.

11. The catalyst of claim 9 wherein said separation is by purging with a gas inert to the product of (1).

12. The catalyst of claim 9 wherein said separation is at a temperature between ambient and 200° C.

13. The catalyst of claim 1 wherein said cocatalyst is a trialkyl aluminum, an alkyl aluminum hydride or a mixture thereof.

14. The catalyst of claim 13 wherein said cocatalyst is an alkyl aluminum and the alkyl groups comprise hydrocarbon chains that are straight or branched and each chain contains about 1 to 10 carbon atoms.

15. The catalyst of claim 1 wherein said cocatalyst comprises an aryl aluminum compound.

16. The catalyst of claim 1 wherein said aluminum compound comprises an alkyl aluminum, an alkyl aluminum halide or a mixture thereof.

17. The catalyst of claim 1 wherein said aluminum compound comprises a trialkyl aluminum or an alkyl aluminum hydride.

18. The catalyst of claim 1 wherein the cocatalyst aluminum compound is in a molar ratio with the product of (3) of from 0.1–100 to 1.

19. The catalyst of claim 18 wherein said ratio is from about 1–20 to 1.

20. The method of making a solid catalyst for use with an alkyl or aryl aluminum compound cocatalyst in the polymerization and copolymerization of 1-olefins by: (1) reacting a halogen free monofunctional organic silicon compound with silica or alumina having surface hydroxyl groups or a mixture thereof, said silicon compound being reactive with said surface hydroxyl groups; (2) reacting the product of (1) with a Group IIA organometallic compound, or complex of an alkyl aluminum compound, of magnesium or calcium; and (3) reacting the product of (2) with a halide or alkoxide of titanium, vanadium, zirconium or mixtures of these; or (2') reacting the product of (1) with an alkyl aluminum halide and a Group IIA organometallic compound, or complex of an alkyl aluminum compound, of magnesium or calcium prior to (3); or (1') reacting the product of (1) with the halide or alkoxide of (3) prior to (2).

21. The method of claim 20 wherein the metal of step (3) is in a concentration of about 0.1–20 weight percent of said solid product.

22. The method of claim 20 wherein said Group IIA compound or complex of (2) comprises an alkyl or aryl of magnesium or a magnesium complex.

23. The method of claim 20 wherein the weight ratio of the Group IIA metal compound to the Group IVB or VB metal compound is from 0.1–100.

24. The method of claim 23 wherein said weight ratio is about 0.1–20.

25. The method of claim 20 wherein one or more of said organometallic compounds contains a halide in addition to the organic moiety.

26. The method of claim 20 wherein said reaction of (1) is with silica which has been predried at about 100°–200° C. for a time sufficient to remove surface water prior to said reaction.

27. The method of claim 20 wherein said organic silicon compound in (1) is in stoichiometric excess thereby facilitating a complete reaction, and said excess is later removed.

28. The method of claim 20 wherein the product of (1) is separated from any unreacted organic silicon compound and reaction by-products.

29. The method of claim 28 wherein said separation is by vacuum suction.

30. The method of claim 28 wherein said separation is by purging with a gas inert to the product of (1).

31. The method of claim 28 wherein said separation is at a temperature between ambient and 200° C.

32. The method of claim 20 wherein said cocatalyst is a trialkyl aluminum, an alkyl aluminum hydride or a mixture thereof.

33. The method of claim 32 wherein said cocatalyst is an alkyl aluminum and the alkyl groups comprise hydrocarbon chains that are straight or branched and each chain contains about 1 to 10 carbon atoms.

34. The method of claim 20 wherein said cocatalyst comprises an aryl aluminum compound.

35. The method of claim 20 wherein said aluminum compound comprises an alkyl aluminum, an alkyl aluminum halide or a mixture thereof.

36. The method of claim 20 wherein said aluminum compound comprises a trialkyl aluminum or an alkyl aluminum hydride.

37. The method of claim 20 wherein the cocatalyst aluminum compound is in a molar ratio with the product of (3) of from 0.1-100 to 1.

38. The method of claim 37 wherein said ratio is from about 1-20 to 1.

39. The catalyst of claim 1 wherein the Group IIA metal of (2) comprises magnesium and the reaction of (3) is performed with titanium.

40. The method of claim 20 wherein the Group IIA metal of (2) comprises magnesium and the reaction of (3) is performed with titanium.

41. A catalyst for use with an alkyl or aryl aluminum compound cocatalyst in the polymerization and copolymerization of 1-olefins, and prepared by: (1) reacting a halogen free monofunctional organic silicon compound with silica or alumina or a mixture thereof; (2) reacting the product of (1) with a Group IIA organometallic compound or complex of magnesium or calcium; and (3) reacting the product of (2) with a halide or alkoxide of titanium, vanadium, zirconium or mixtures thereof to produce a solid catalyst product.

42. The method of making a catalyst for use with an alkyl or aryl aluminum compound cocatalyst in the polymerization and copolymerization of 1-olefins by: (1) reacting a halogen free organic monofunctional silicon compound with silica of alumina or a mixture thereof; (2) reacting the product of (1) with a Group IIA organometallic compound or complex of magnesium or calcium; and (3) reacting the product of (2) with a halide or alkoxide of titanium, vanadium, zirconium or mixtures thereof to produce a solid catalyst product.

43. A solid polymerization catalyst component prepared by mixing:
(a) a support obtained by reacting silica having surface hydroxyl groups with a halogen free monofunctional silylating compound which is reactive with said surface hydroxyl groups, with
(b) an organomagnesium compound including a component of the formula $MgR_2$ where R is a hydrocarbon radical, and
(c) a tetravalent titanium compound.

44. A method of making a solid polymerization catalyst component by the steps of mixing
(a) a support obtained by reacting silica having surface hydroxyl groups with a halogen free monofunctional silylating compound which is reactive with said surface hydroxyl groups, with
(b) an organomagnesium compound including a component of the formula $MgR_2$ wherein R is a hydrocarbon radical, and
(c) a tetravalent titanium compound.

* * * * *